(12) United States Patent
Al-Otaibi et al.

(10) Patent No.: US 10,910,122 B2
(45) Date of Patent: Feb. 2, 2021

(54) CONTAINMENT DESIGN TO HANDLE LOW TEMPERATURE SYSTEMS

(71) Applicant: Saudi Arabian Oil Company, Dhahran (SA)

(72) Inventors: Abdullah M. Al-Otaibi, Khobar (SA); Omar S. Al-Mutairi, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 16/117,759

(22) Filed: Aug. 30, 2018

(65) Prior Publication Data
US 2020/0075189 A1      Mar. 5, 2020

(51) Int. Cl.
*G21F 7/04* (2006.01)
*B08B 15/02* (2006.01)
(Continued)

(52) U.S. Cl.
CPC ............ *G21F 7/041* (2013.01); *B08B 15/026* (2013.01); *B25J 21/02* (2013.01); *G21F 7/045* (2013.01);
(Continued)

(58) Field of Classification Search
CPC ....... B08B 15/02; B08B 15/026; B08B 9/023; B09B 3/0066; G21F 7/02; G21F 7/041;
(Continued)

(56) References Cited

U.S. PATENT DOCUMENTS 3,051,163 A * 8/1962 Trexler .................... B25J 21/02
312/1
4,121,842 A * 10/1978 Lacy ........................ F16L 51/00
277/616
(Continued)

FOREIGN PATENT DOCUMENTS

GB       2173143 A  * 10/1986  ........... B08B 15/026
GB       2349933 A  * 11/2000  ............. B08B 9/023
(Continued)

OTHER PUBLICATIONS

Invitation to pay additional fees and where applicable protest fees dated Nov. 26, 2019.
(Continued)

*Primary Examiner* — Andrew M Roersma
(74) *Attorney, Agent, or Firm* — Bracewell LLP; Constance R. Rhebergen

(57)       ABSTRACT

A containment system and method for creating a confined space around a portion of a piping circuit, and for maintaining the confined space at a designated pressure with a pressurized blanketing gas. The confined spaced with its controlled environment protects against process upsets or icing when insulation is removed from sections in extreme temperature services. The containment system includes a shroud assembly that is made up of a cover configured into a tubular shape, and end plates on axial ends of the cover that mount onto the piping. Support rings are set within the cover that also mount to the pipe, and which provide radial support for the cover along the span between the end plates. Ports are
(Continued)

formed through a sidewall of the cover that provide operations personnel access to the piping. Lines carrying the pressurized blanketing gas connect to inlets formed in the cover sidewall.

17 Claims, 6 Drawing Sheets

(51) Int. Cl.
*B25J 21/02* (2006.01)
*B01L 1/02* (2006.01)
*F16L 55/16* (2006.01)
*G21F 7/02* (2006.01)
*F16L 55/168* (2006.01)
*G01N 35/00* (2006.01)

(52) U.S. Cl.
CPC .......... *B01L 1/025* (2013.01); *F16L 55/168* (2013.01); *G01N 2035/00277* (2013.01); *G21F 7/02* (2013.01)

(58) Field of Classification Search
CPC . G21F 7/045; B25J 21/02; B01L 1/025; F16L 55/168; G01N 2035/00277
USPC .......................................................... 312/1
See application file for complete search history.

(56) References Cited

U.S. PATENT DOCUMENTS

| | | | |
|---|---|---|---|
| 4,487,643 A * | 12/1984 | Ellett | .................... B08B 7/0092 156/155 |
| 4,505,190 A | 3/1985 | Fink et al. | |
| 4,626,291 A | 12/1986 | Natale | |
| 4,820,000 A | 4/1989 | Jacobson | |
| 4,842,347 A | 6/1989 | Jacobson | |
| 4,883,329 A | 11/1989 | Flannery et al. | |
| 4,912,358 A | 3/1990 | Vitta | |
| 4,934,763 A * | 6/1990 | Jacobons | ................. B25J 21/02 24/DIG. 50 |
| 4,960,143 A * | 10/1990 | Dore, Jr. | ................. B08B 15/026 134/199 |
| 5,017,197 A | 5/1991 | McGuire et al. | |
| 5,147,242 A * | 9/1992 | Lowe, Jr. | ............. B08B 15/026 312/1 |
| 5,536,077 A | 7/1996 | Ross | |
| 5,551,138 A * | 9/1996 | Grajewski | ................. H02G 1/14 29/423 |
| 9,453,607 B2 | 9/2016 | Moeskjaer et al. | |
| 2005/0279386 A1* | 12/2005 | Wall | ..................... B08B 15/026 134/21 |
| 2008/0076341 A1* | 3/2008 | Wardlaw | ............... B08B 15/026 454/63 |

FOREIGN PATENT DOCUMENTS

| | | | | |
|---|---|---|---|---|
| JP | 05196193 A | | 6/1993 | |
| JP | H11230475 A | | 8/1999 | |
| JP | 2012122586 A | | 6/2012 | |
| KR | 20090001187 U | | 2/2009 | |
| KR | 101748380 B1 | * | 6/2017 | |
| KR | 101837904 B1 | | 4/2018 | |
| KR | 20180043673 A | | 4/2018 | |
| WO | WO-8603444 A1 | * | 6/1986 | .......... B08B 15/026 |
| WO | WO-2019213188 A1 | * | 11/2019 | .............. B08B 9/02 |

OTHER PUBLICATIONS

International Search Report and Written Opinion for related PCT application PCT/US2019/049056 dated Jan. 24, 2020.

* cited by examiner

CONTAINMENT DESIGN TO HANDLE LOW TEMPERATURE SYSTEMS

BACKGROUND OF THE INVENTION

1. Field of Invention

The present disclosure relates to a system for and method of containing a space around pipe and/or equipment within a piping circuit. More specifically, the present disclosure relates to a system for and method of containing a space that circumscribes at least a portion of a piping circuit, and providing operations and maintenance personnel access to the piping. The access ranges from hand access, to full body access.

2. Description of Prior Art

Flow circuits in processing facilities that include vessels, tanks, heat exchangers, and reactors (the equipment) typically include piping for transferring fluid between these pieces of equipment. Fluid in some processes is at temperatures that vary significantly from ambient temperature. The equipment and piping is usually insulated when it is important that the fluid temperature not appreciably change when being handled by the system. When the fluid in the system is at a temperature well below ambient, the insulation is often sized to avoid heat gain in the fluid, and to maintain its outer surface at a temperature above ambient dew point to prevent condensate or ice formation.

Uninsulated systems handling cryogenic fluid or other cold fluids is also at risk of ice formation on its surface. Because of process upsets created by uninsulated high or low temperature piping, and the icing of uninsulated low temperature piping, the entire circuit containing the affected piping is generally removed from service prior to repairing or maintaining the affected piping in these services. Sometimes one or more processes are associated with the piping circuit being shut down, and also must be taken off line during the maintenance or repair, which significantly increases costs incurred for servicing the affected piping and costs associated with production losses.

SUMMARY OF THE INVENTION

Disclosed herein is an example of a containment system for use with a piping circuit, and which includes a cover of optionally different sizes and shapes, and that selectively circumscribes a portion of the piping circuit, or equipment, to define a confined space around the selected components. In an example, the space is sized to accommodate full or partial entry by one or more technicians, and to enable access maintenance, repair, or replacement of a targeted part of piping circuit. In an alternative, a smaller version of the system is built around the pipe portion, and between the cover and an outer surface of the portion of the piping circuit are annular support rings that are axially slideable along the portion of the piping circuit, equipment, and other components of the piping circuit. The rings are also in selective supporting contact with the cover. End plates are optionally coupled to opposing axial ends of the cover. An optional larger version of the system is disposed around piping and equipment, and supported on beams. In an alternative, a fluid inlet port is included with the system which is formed through a sidewall of the cover and that is in selective communication with a source of pressurized blanketing gas, so that when pressurized blanketing gas is directed into the confined space, the pressurized blanketing gas provides a thermal barrier between an uninsulated section of the portion of the piping circuit and ambient to the cover. Further included in this example is a diffuser between the fluid inlet port and the portion of the piping circuit, and which disperses the pressurized blanketing gas into the confined space and diverts a stream of the pressurized blanketing gas away from direct contact with the portion of the piping circuit. In one alternative, the fluid inlet port is a first fluid inlet port and the containment system further includes a second fluid inlet port and a manifold connected between the source of the pressurized blanketing gas and the first and second fluid inlet ports. Embodiments exist where the pressurized blanketing gas is nitrogen or dry air, is at a pressure greater than a pressure outside of the cover, and at a temperature so that the pressurized blanketing gas defines a thermal barrier between an uninsulated section in the portion of the piping circuit. The containment system optionally includes a tray supported in the cover that selectively receives tools. Examples exist where the end plates each have an inner ring that mounts onto an outer surface of the portion of the piping circuit, an outer ring circumscribing the inner ring, and sidewalls that extend radially between the inner ring and outer ring, and so that the cover is supported on the piping circuit. Gaps optionally extend radially through the end plates and that are selectively expandable so that the piping circuit is received in the inner ring. The support rings alternatively include an inner ring that mounts onto an outer surface of the portion of the piping circuit, an outer ring circumscribing the inner ring, and strut members that extend radially between the inner ring and outer ring.

Also described herein is another example of a containment system for use with a piping circuit, and which includes a cover that is a sheet like transparent material formed into a tubular member, and disposed around a portion of the piping circuit, end plates that sealingly engage opposing ends of the cover, a confined space defined in an annulus between the cover and outer surface of the piping circuit and that is axially bounded by the end plates, and blanketing gas in the contained space that forms a thermal barrier between an uninsulated section of the portion of the piping circuit and ambient to the cover. The containment system optionally includes annular support rings disposed in the confined space, and that each have an outer circumference in supporting contact with the cover. Ends of the cover alternatively extend in a direction axial to the tubular, and that releasably join along a seam that extends substantially the length of the tubular. Access ports are optionally formed through a sidewall of the cover, and gloves sealingly secured along the access ports.

A method of containing a piping circuit is also described herein, and which includes sealing around a portion of the piping circuit to define a confined space, removing cladding from around a section of the portion of the piping circuit within the confined space so that some of the piping in the section is exposed to conditions in the confined space, and controlling a flow of a blanketing fluid into the confined space so that a thermal barrier is maintained between an outer surface of the piping and ambient to the confined space. In one example, a temperature differential exists radially across the thermal barrier so that ice is prevented from forming on the piping when cryogenic fluids are flowing inside the piping. A cover is optionally used to form a portion of the confined space, the method further including supporting a mid-portion of the cover with an axially slideable element. In one alternative, the blanketing fluid is provided to the confined space at a pressure that is greater than that ambient to the confined space. The method further optionally includes diverting the blanketing fluid from the piping and diffusing the blanketing fluid in the confined space. In one example of the method, a tool is used inside of the confined space, and placed on a tray disposed in the confined space.

BRIEF DESCRIPTION OF DRAWINGS

Some of the features and benefits of the present invention having been stated, others will become apparent as the description proceeds when taken in conjunction with the accompanying drawings, in which.

Figure 1:
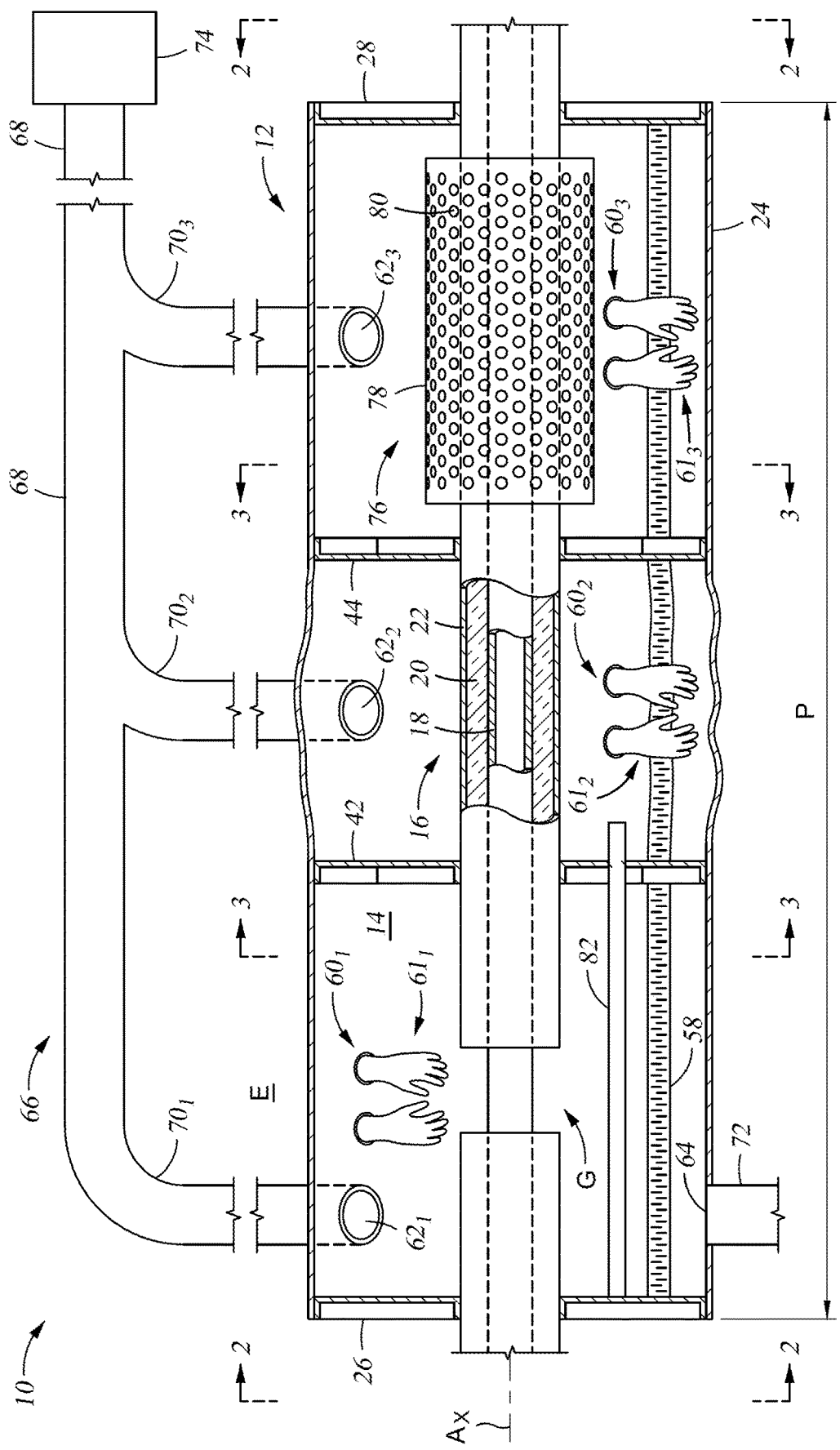
FIG. 1 is a schematic example of a containment system for use with a piping run.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a side elevational view in FIG. 1 is an example of a containment system 10 that includes a shroud assembly 12 for forming a confined space 14 around a portion P of a piping circuit 16. Piping circuit 16 of FIG. 1 includes an inner pipe 18 for handling fluids, examples exist where the fluids are liquid, vapor, two-phase flow, a slurry, or combinations thereof. Further examples of fluid include superheated fluids, such as steam, or subcooled fluids, which include cryogenic fluids. In the illustrated example, piping circuit 16 also includes insulation 20, which is shown circumscribing the pipe 18, and which is for providing a thermal barrier between the pipe 18 and that ambient to pipe 18. In a further alternative, piping circuit 16 includes an optional cladding 22 shown covering the insulation 20 and which in an example is be formed from a material different from that of the insulation 20. Example materials for the insulation 20 include fiberglass, refractory materials, silica composites, foams, gels, and the like. Example materials for the cladding 22 include aluminum, aluminum alloys, steel, steel alloys, and the like. Shroud assembly 12 includes a cover 24 which is shown as a generally tubular member formed from a planar flexible sheet, such as a transparent polymeric material. End plates 26, 28 are illustrated that are sealingly engaged to opposing axial ends of the cover 24. As shown, the end plates 26, 28 form axial terminal locations for the confined space 14. Example means for sealingly securing the cover 24 to the end plates 26, 28 include straps, belts, hook, loop fasteners and combinations thereof.

Figure 2:
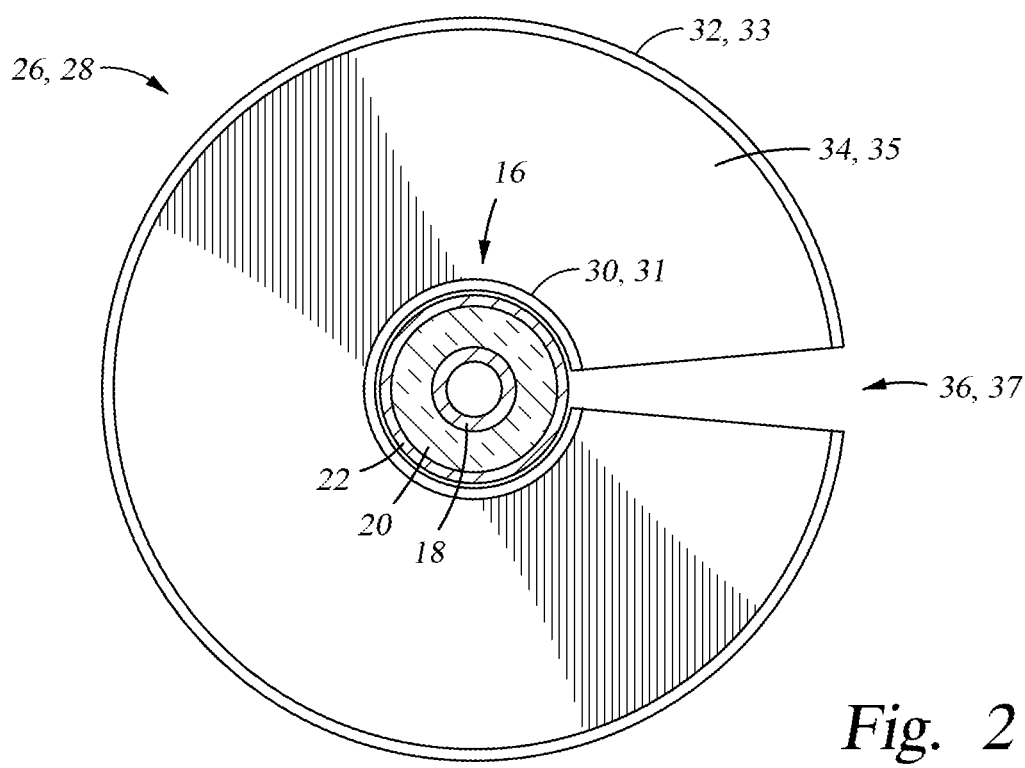
FIG. 2 is an axial view of an example of an end plate for use with the containment system of FIG. 1.

Shown in an axial view in FIG. 2 and taken along lines 2-2 of FIG. 1 is an elevational view of examples of the end plates 26, 28. In this example, end plates 26, 28 each have an inner ring 30, 31 that circumscribes the outer surface of the piping circuit 16 when the end plates 26, 28 are mounted on piping circuit 16. Outer rings 32, 33 are disposed radially outward from inner rings 30, 31, and which define an outer circumference of the end plates 26, 28. Sidewalls 34, 35 span the radial space between the inner rings 30, 31 and outer rings 32, 33, and form axial barriers to flow for the confined space 14 (FIG. 1). A gap 36, 37 is shown extending radially from inner rings 30, 31 through outer rings 32, 33 and provides a way of fitting the end plates 26, 28 over the piping circuit 16.

Figure 2A:
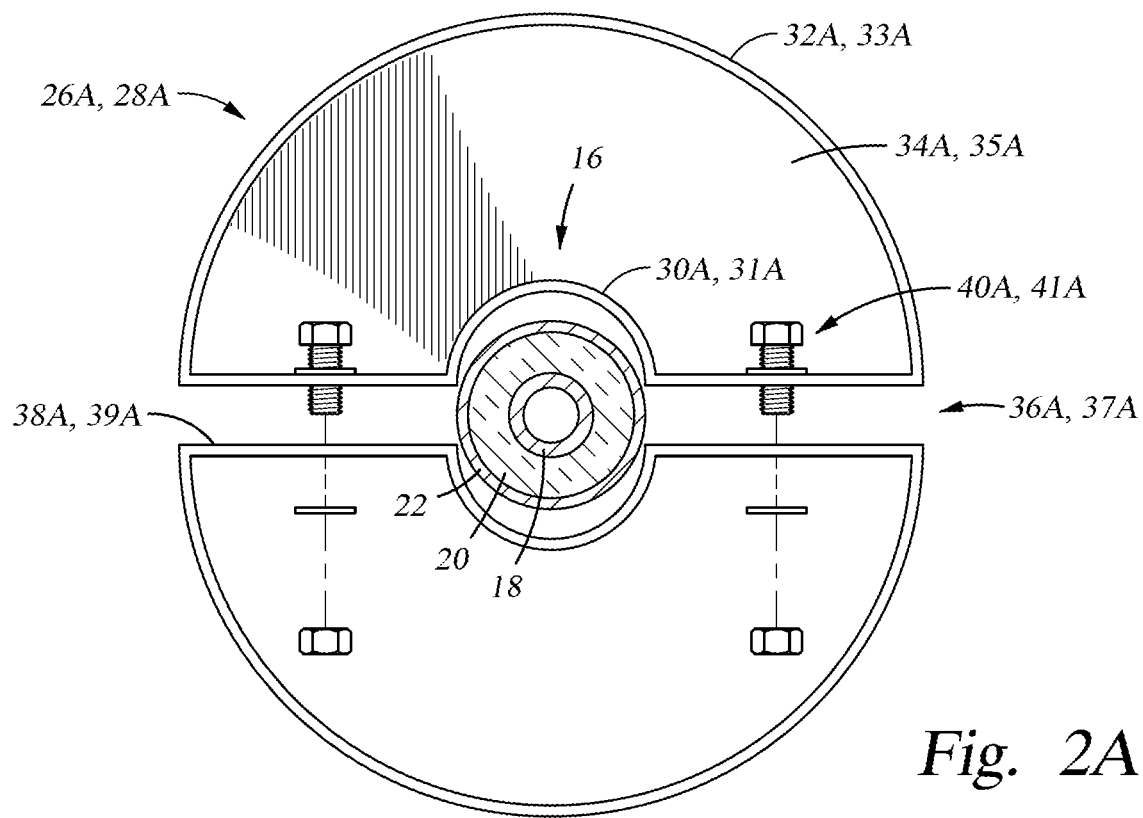
FIG. 2A is an axial view of an alternate embodiment of the end plate of FIG. 2.

An alternate embodiment of the end plates 26A, 28A are shown in FIG. 2A, which have gaps 36A, 37A that extend across the entire diameter of end plates 26A, 28A. In this example, radial flanges 38A, 39A border opposing lateral sides of gaps 37A, 37A, flanges 38A, 39A extend radially outward from opposite sides of inner ring 30A, 31A and project past outer rings 32A, 33A. Flanges 38A, 39A have sufficient axial width to accommodate formation of passages (not shown) that receive optional fasteners 40A, 41A, which couple together flanges 38A, 39A, and the semi-circular portions of end plates 26A, 28A around piping circuit 16.

Referring back to FIG. 1, annular support rings 42, 44 are shown disposed within the confined space 14. Support rings 42, 44 are supported on the piping system 16 by their respective inner radii, and have outer surfaces that provide radial support for cover 24. In an example, support rings 42, 44 are axially slideable along the axis $A_X$ of piping circuit 16 so that space is made available for operations personnel to maintain and/or repair a portion P of the piping circuit 16 within confined space 14. Embodiments exists having a single support ring, or more than two. One advantage provided by the slideable support rings 42, 44 is that a size of a work space is readily adjustable to accommodate various scenarios.

Figure 3:
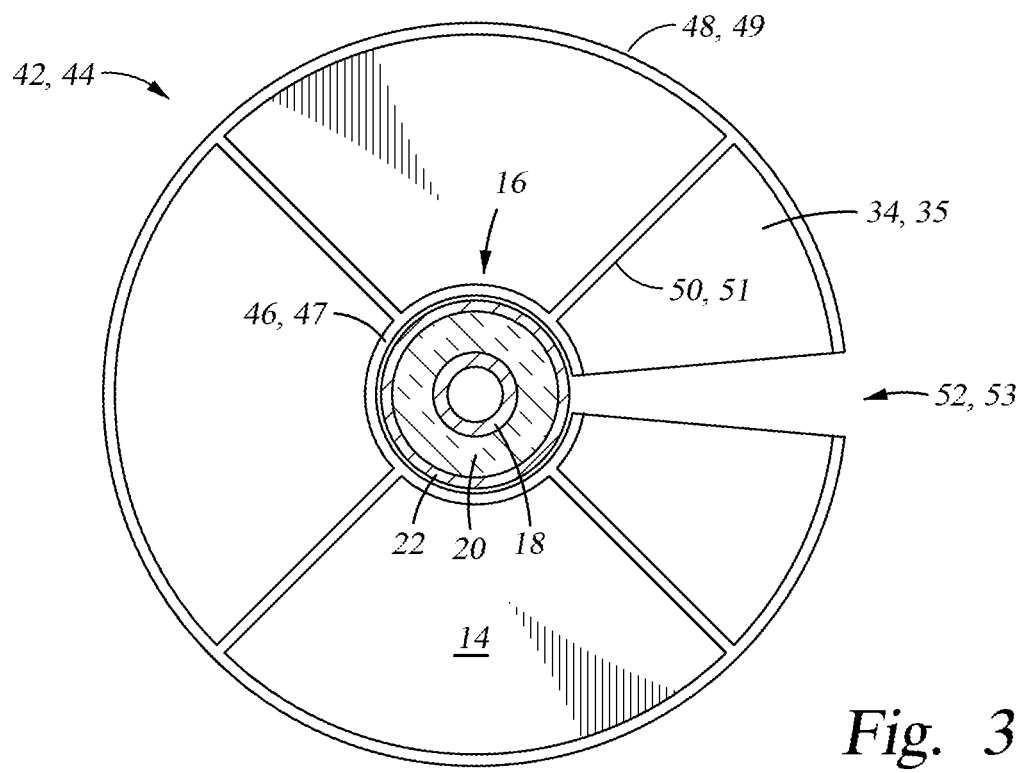
FIG. 3 is an axial view of an example of a support ring for use with the containment system of FIG. 1.

Referring to FIG. 3, shown in an axial side view is an example of support rings 42, 44 and where each have an inner ring 46, 47 circumscribing the outer surface of piping circuit 16. Support rings 42, 44 include outer rings 48, 49, shown spaced radially outward from inner rings 46, 47 and which define an outer circumference of support rings 42, 44. Radially extending struts 50, 51 extend between inner rings 46, 47 and outer rings 48, 49 and provide support for outer rings 48, 49. Gaps 52, 53 are shown that project radially through inner rings 46, 47 and outer rings 48, 49. Similar to gaps 36, 37, gaps 52, 53 provide a way for the support rings 42, 44 to be disposed on the piping circuit 16 (FIG. 1).

Figure 3A:
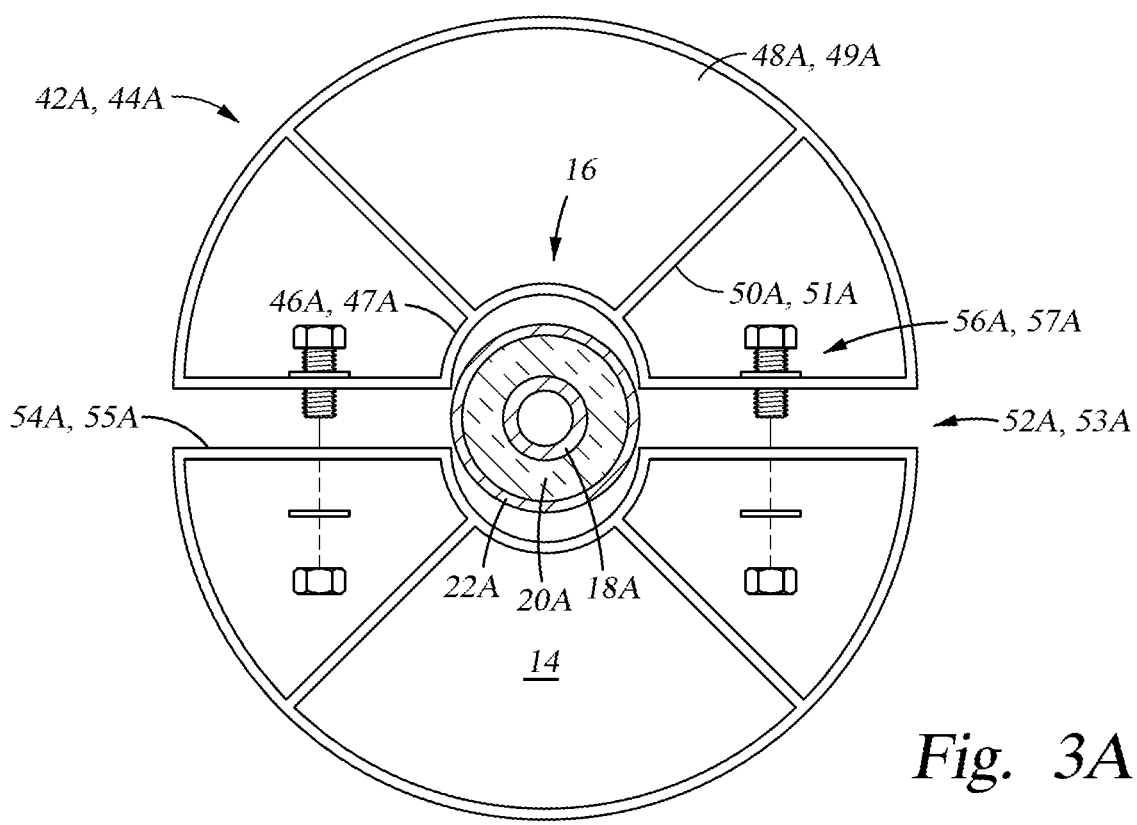
FIG. 3A is an axial view of an alternate embodiment of the support ring of FIG. 3.

In an alternate embodiment shown in FIG. 3A, support rings 42A, 44A have gaps 52A, 53A across their entire diameter, so that support rings 42A, 44A are bisected and optionally set over the piping circuit 16 in a clamshell-like fashion. Flanges 54A, 55A border the lateral sides of gaps 52A, 53A and along the diameter of each of the support rings 42A, 44A. Passages (not shown) perpendicularly formed through the flanges 54A, 55A selectively receive fasteners 56A, 57A within for clamping together the two sections of the support rings 42A, 44A.

Referring back to FIG. 1, an example of a longitudinal seam 58 is shown extending substantially the entire length of cover 24; axial longitudinal ends of the material making up cover 24 of FIG. 1 are joined along seam 58. Examples of the seam 58 include a zipper, a tongue and groove arrangement, hook and loop fasteners, and the like. In the illustrated embodiment, a series of access ports $60_{1-3}$ are shown formed through the sidewall of cover 24, which provide access by operations personnel into the confined space 14. Gloves $61_{1-3}$ are optionally provided with each of the access ports $60_{1-3}$ that provide operations personnel access to confined space 14 and hardware within. Gloves $61_{1-3}$ connect to access ports $60_{1-3}$ along their periphery to maintain a sealed environment within the shroud assembly 12.

Further illustrated in the example of FIG. 1 are fluid inlet ports $62_{1-3}$ formed through a sidewall of cover 24 and which allow for a flow a blanketing gas to enter into the confined space 14. In an example, the blanketing gas includes nitrogen and is at a pressure so that pressure inside the confined space 14 is greater than that of an environment E ambient to the confined space 14. In a further example, the temperature of the blanketing gas is such that when a portion of the insulation 20 is removed, such as illustrated by gap G, the blanketing gas forms a thermal barrier for the exposed pipe 18 so that fluid within pipe 18 is not affected by the ambient temperature, i.e., causes a localized increase in temperature that could flash a subcooled liquid or condense a superheated vapor. Additionally, the presence of the blanketing gas at a temperature such that ice or other condensate is prevented from forming on the outer surface of pipe 18. It is within the capabilities of those skilled in the art to designate a pressure and temperature of the blanketing gas so that a thermal barrier is formed between the pipe and environment E ambient to cover 24 and confined space 14. Further included with the containment system 10 of FIG. 1 is a fluid outlet port 64 to allow blanketing fluid within confined space 14 to be discharged from within the confined space 14.

A manifold 66 is shown which provides one example way of directing blanketing fluid to the fluid inlet ports $62_{1-3}$. Included with manifold 66 is a supply line 68 from which leads $70_{1-3}$ branch and then connect to the respective access port $60_{1-3}$. Additionally, a discharge line 72 is shown connected with fluid outlet port 64 and for directing blanketing fluid being discharged through fluid outlet port 64 to a location away from confined space 14. An end of supply line 68 distal from leads $70_{1-3}$ connects to a fluid supply 74 which can be any type of compressor or other device for providing a blanketing fluid at a designated pressure and temperature. Examples of operation include a steady flow of blanketing gas from fluid supply 74 to confined space 14 which is then discharged through outlet port 64. Alternatively, batch flows of blanketing gas are dispensed to confined space 14, that are repeated at regular or irregular intervals. Further optional embodiments include a check valve (not shown) in discharge line 72 to prevent back flow into confined space 14, and where the total cross sectional area of fluid inlet ports $62_{1-3}$ exceeds the cross sectional area of outlet port 64 so that a backpressure is maintained in the confined space 14.

Still referring to FIG. 1, also shown set within the confined space 14 is a diffuser 76 which is used to divert a direct flow of blanketing fluid from inlet ports $62_{1-3}$ away from the piping circuit 16. In the example illustrated, diffuser 76 includes a body 78 which is a tubular-like member that circumscribes a portion P of piping circuit 16. Perforations 80 are formed radially through the body 78 and which allow a diffused flow to enter into the space within body 78 thereby avoiding a direct flow of blanketing fluid onto a dedicated section of the piping circuit 16. Radial struts (not shown) support the diffuser 76 on the piping system 16. Embodiments exist where the diffuser 76 circumscribes a finite portion of the circumference of the piping system 16 and along an arc that is in a path between the inlet ports $61_{1-3}$ and outer surface of piping system 14. Diffusing the flow of blanketing gas more evenly distributes the gas within the confined space 14 which minimizes temperature differentials within the confined space 14 and along the portion P of the piping system 16. Optionally, a tray 82 is shown supported within confined space 14. The tray 82 in one example provides a place for placing tools (not shown) or other objects within the confined space 14 and that are being used by operations personnel. In one example, tray 82 mounts to one or both of the support rings 42, 44, and thus is moveable axially within the confined space 14 with axial movement of the one or both support rings 42, 44.

In one non-limiting example of operation, the shroud assembly 12 is assembled over a portion P of piping circuit 16 where maintenance and/or repair of piping circuit 16 is to take place. As indicated above, assembling the shroud assembly 12 over the portion P the of piping circuit 16 forms the confined space 14. An amount of blanketing fluid is introduced into the confined space 14, such as through the inlet ports $62_{1-3}$ and which originates from fluid supply 74. Flowing the blanketing fluid into the confined space 14 at a pressure greater than a pressure in the confined space 14, and so that fluid present in the confined space 14 is evacuated through the outlet port 64, fills the confined space 14 with the blanketing fluid. In an alternative, when the confined space 14 is at a designated condition, i.e. designated temperature and/or pressure, a portion of the cladding 22 and insulation 20 is removed from around the pipe 18, which creates gap G in the portion P of the piping circuit 16. Examples exist where the blanketing fluid is at a designated temperature so that a thermal barrier is created around the exposed portion of pipe 18 shown within gap G. Examples of the blanketing fluid include nitrogen gas, such as in a pressurized bottle or cylinder, and which connects to the ports $62_{1-3}$. In an alternative, ambient air is directed into the space 14, that is optionally dehumidified. Further optionally, the ambient air is dried prior to being introduced into the space 14, such as through a desiccant or a skid mounted unit having a compressor, tanks, and moisture absorbing material. Drying the air prior to introducing it into the space 14 removes moisture that otherwise might condense on equipment inside the space 14. Pressure of the nitrogen or dried air is maintained at a level greater than that ambient to the cover 24. In a non-limiting example, a thermal barrier provides the functionality of insulation so that although a significant temperature difference exists between the fluid in the pipe 18 and temperature in the environment E ambient to the pipe 18, ice or condensate does not form on the pipe 18. Further in this example, with the thermal barrier in place, heat transfer across walls of the pipe 18 is maintained at a level such that fluid inside the pipe 18 does not undergo a change of state, i.e. does not flash or condense. In one alternative use, operations personnel extend hands through the access port $60_{1-3}$ and into one of the sets of gloves $66_{1-3}$, and thereby have access to the confined space 14 such as for maintaining or repairing portions of the pipe 18 within portion P of piping circuit 16. As previously noted, during operations on the pipe 18, applying the blanketing fluid enables removal of insulation 20 to expose pipe 18, without allowing ice or condense to form on pipe 18, or causing a state changing condition within the fluid in the pipe 18. Accordingly, the process associated with the piping circuit 16 is not suspended or shut down, but allowed to operate in a normal fashion while the operations to the piping circuit 16 and portion P the of piping circuit 16 within shroud 12 are conducted. When the prescribed maintenance or repair are complete, the insulation 20 and cladding 22 removed are replaced into the gap G.

Figure 4:
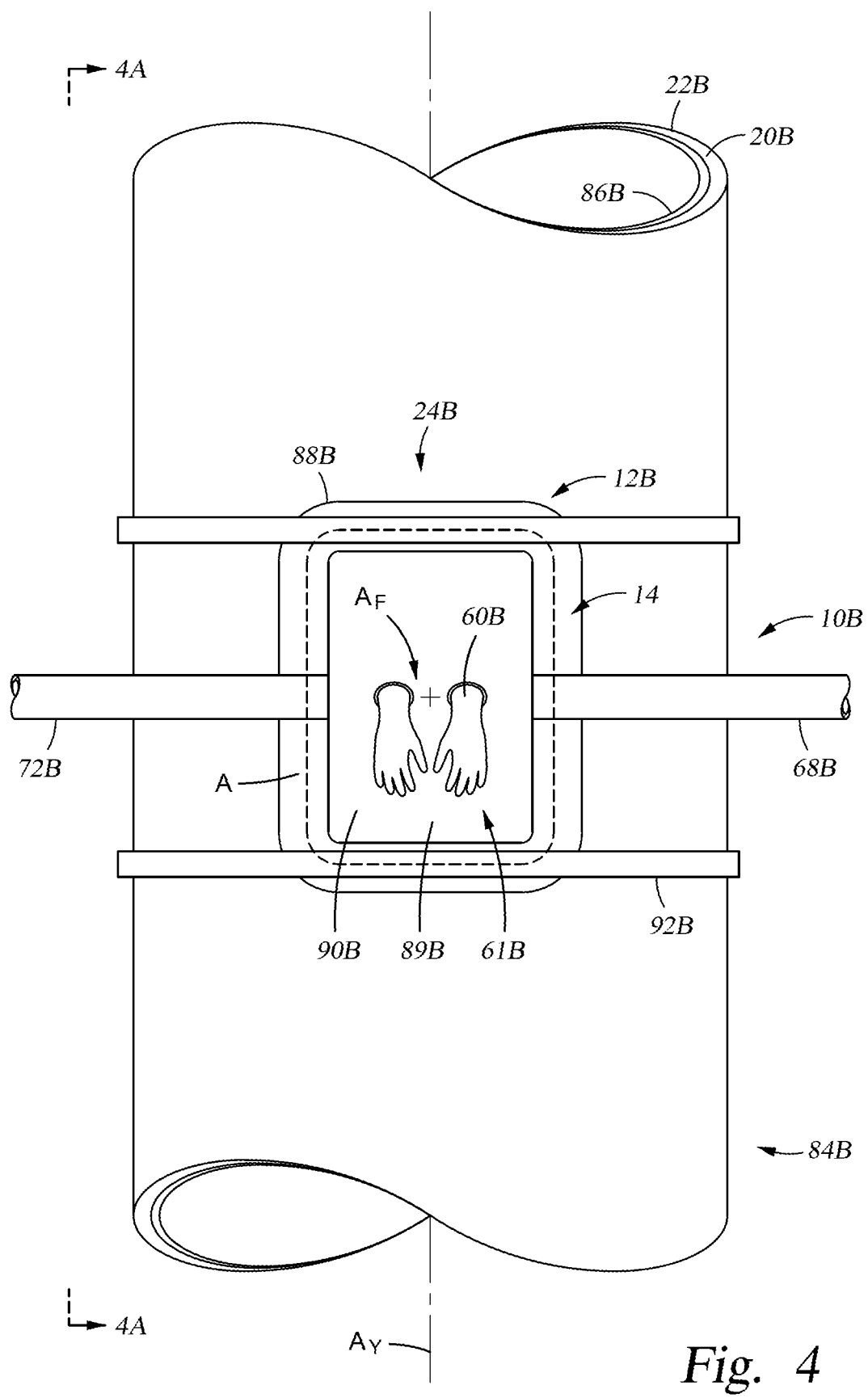
FIGS. 4 and 4A are elevational and plan views of an alternate embodiment of a containment system mounted on a vessel.
Figure 4A:
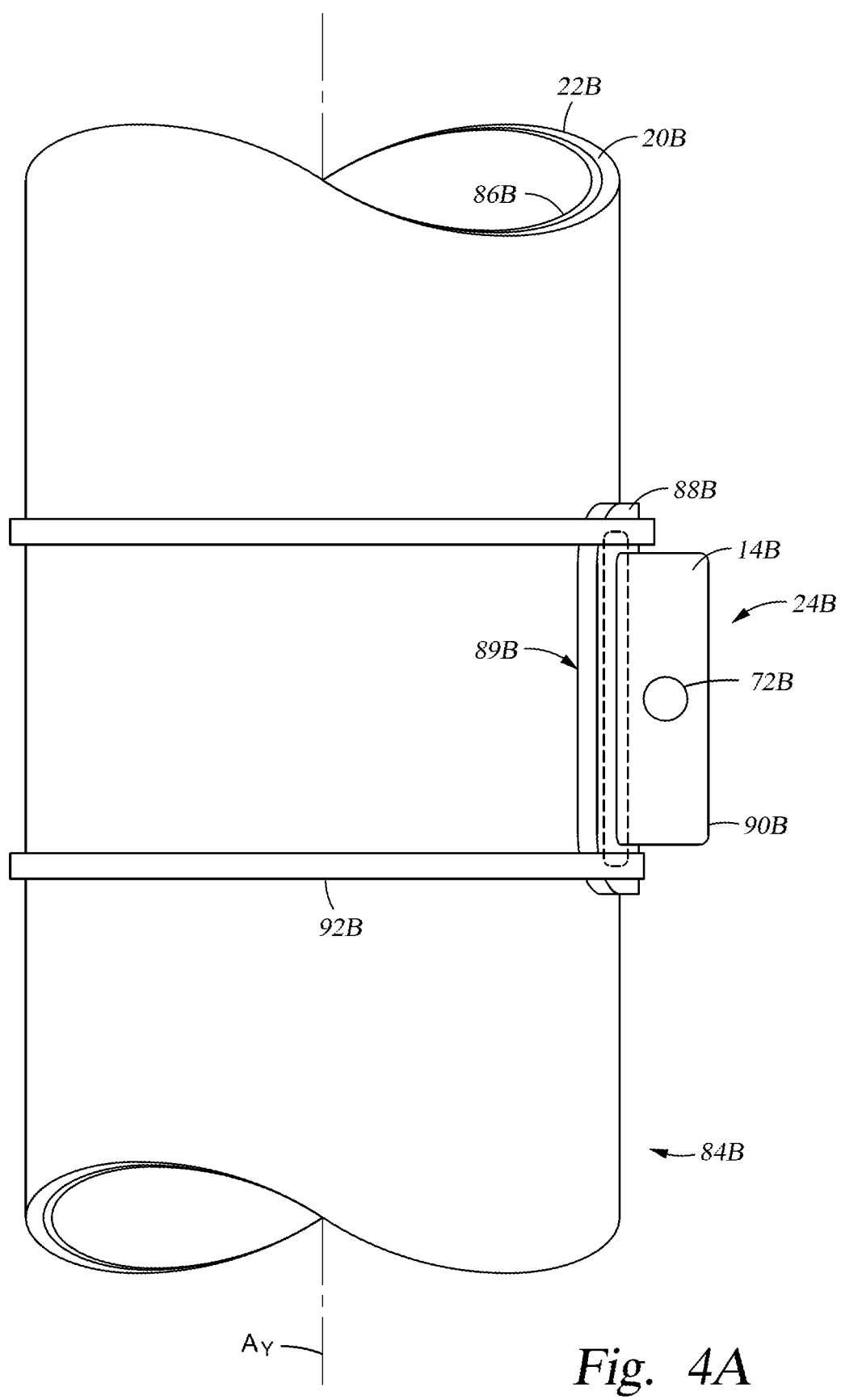

Shown in an elevational view in FIG. 4 is an example of an alternate embodiment of a containment system 10B mounted to a vessel 84B. Examples of the vessel 84B include anything containing a fluid or a flowable material, such as but not limited to towers, tanks, reactors, mixers, heat exchangers, specialty piping items and the like. Vessel 84B includes insulation 20B on its outer wall 86B, where cladding 22B covers the insulation 20B. An embodiment of a cover 24B is shown mounted on an outer surface of vessel 84B, and which includes a flange 88B on its outer periphery. Flange 88B as shown is a planar member with a ring like or picture frame like configuration that is in sealing contact with an outer surface of the cladding 22B. Flange 88B has a height extending along an axis $A_Y$ of the vessel 84B, a width that extends along a circumference of vessel 84B, and a thickness extending radially from axis $A_Y$. The example of the flange 88B is illustrated as generally rectangular, but alternative embodiments include any shape, such as but not limited to circular, elliptical, and triangular. An axis $A_F$ of the flange 88B extends radially outward from axis $A_Y$ of the vessel 84B, and that is circumscribed by an inner radius of flange 88B, which defines an opening 89B through the flange 88B along axis $A_F$ and radially outward from axis $A_F$. The outer surface of vessel 84B is accessible through opening 89B. Further included with cover 24B is a canopy 90B having sidewalls that connect to the inner radius of flange 88B and that project a distance away from vessel 84B and along axis $A_F$. A top surface of canopy 90B spans radially from axis $A_F$ between terminal ends of the sidewalls distal from flange 88B. The cover, sidewalls, and sealing interface between flange 88B and outer surface of vessel 84B form a confined space 14B along a portion of the outer surface of vessel 84B. One example of securing the containment system 10B to vessel 84B includes belts 92B that are shown at axial opposite ends of flange 88B that restrain flange 88B and canopy 90B to vessel 84B. Gloves 61B are shown having ends mounted to access ports 60B formed through the top surface of canopy 90B, and that provide access to the outer surface of vessel 84B by operations personnel. In a non-limiting example of use, insulation 20B and cladding 22B are removed from along an area A of the outer surface of vessel 84B, and which registers with the confined space 14B. Examples exist where the cross sectional area of opening 89B about axis $A_F$ is greater than, equal to, or less than that of area A. Fluid for pressurizing confined space 14B is delivered through canopy 90B via supply line 68B, and vented into discharge line 70B.

Figure 5:
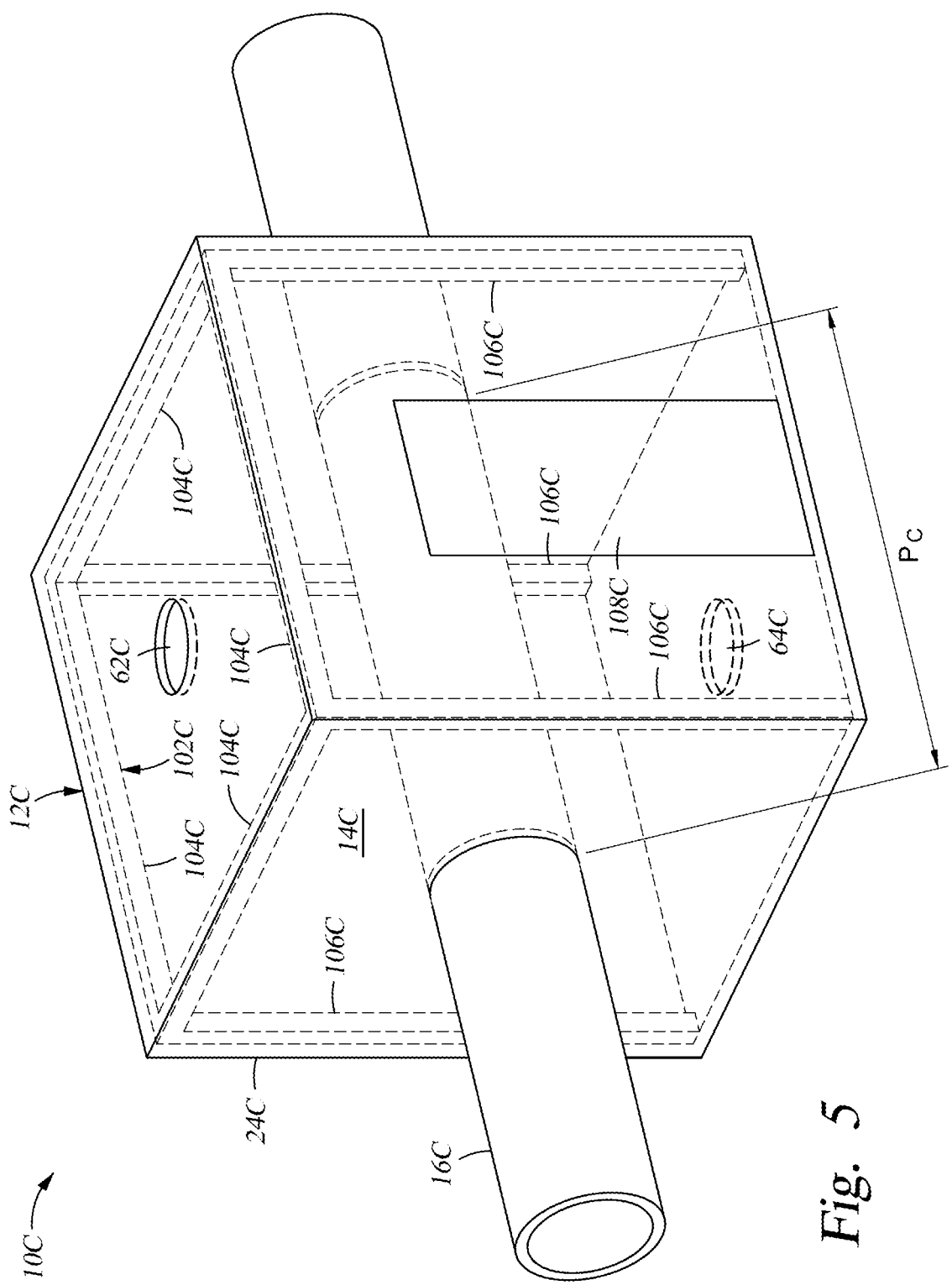
FIG. 5 is a perspective view of an alternate example of a containment system.

An alternate example of containment system 10C is shown in a side perspective view in FIG. 5. In this example shroud assembly 12C is supported on a frame 102C; where frame 102C includes a series of horizontally oriented elongate beams 104C (shown in dashed outline) coupled together on their respective ends into a rectangular configuration. Frame 102C of FIG. 5 further includes vertically oriented elongate beams 106C (shown in dashed outline), illustrated perpendicular to beams 104C; and on which beams 104C are supported. As illustrated, beams 106C are positioned so that their upper ends are in supporting contact with beams 104C proximate to where adjacent ones of the beams 104C are engaged. Alternately, beams 106C are positioned at different locations along lengths of beams 104C, and are optionally irregularly spaced apart from one another. Shroud assembly 12C of FIG. 5 has a shape similar to that of an outer periphery of frame 102C, and is depicted having planar surfaces; and where adjacent planar surfaces are substantially perpendicular to one another. An example of a confined space 14C is formed in the space between the cover 24C and portion $P_C$ of piping circuit 16C. Example fluids handled by piping circuit 16C include those at temperatures higher than ambient temperature, lower than ambient temperature, subcooled temperatures, and cryogenic temperatures. Inlet and outlet ports 62C, 74C are shown formed through the cover 24C, and respectively through upper and lower sidewalls of the shroud assembly 12C. Alternate embodiments have the inlet and outlet ports 62C, 74C on different sidewalls than those illustrated, and in a further embodiment the inlet and outlet ports 62C, 74C are disposed on the same sidewall. In a further example, conditions, such as temperature, humidity and like within confined space 14C are controlled or regulated by providing fluid into space 14C and through inlet port 62C; in a manner similar to or the same as that described with reference to the example of FIG. 1. In this example, fluid for conditioning space 14C is discharged through outlet port 74C. A panel 108C is shown formed in a sidewall of cover 24C, and which is at least partially separatable from the sidewall in which it is formed. Separating panel 108C from the surrounding sidewall provides a technician or other operations personnel full ingress into the space 14C. In an example, the space 14C has ample dimensions to receive and contain a technician or other operations personnel, and while standing. Example dimensions of the shroud assembly 12C, or space 14C, are a height of about 1.0 to 2.0 meters, a length of about 1.5 meters to about 3 meters, and a width of about 1.0 meters to 2.0 meters. Further optionally, the containment system 10C is mobile and transportable to and from different locations.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, a portion of cover 24 is fitted with a reflective foil so that radiative thermal energy is reflected away from the confined space 14. In another example, insulation is provided within sections of cover 24 as well as endplates 26. Further optionally, the blanketing gas is chilled or heated by the fluid within the portion P of the piping circuit 16, such as by a heat exchanger, prior to being introduced into the confined space 14. Embodiments exist where included with the piping circuit 16 are towers, reactors, vessels, heat exchangers, pumps, compressors, and other processing equipment (not shown), and around a portion or all of a confined space 14 is created with embodiments of the containment system 10. These and other similar modifications will readily suggest themselves to those skilled in the art, and are intended to be encompassed within the spirit of the present invention disclosed herein and the scope of the appended claims.

What is claimed is:

1. A containment system for use with a piping circuit comprising:
   a cover that selectively circumscribes a portion of the piping circuit to define a confined space between the cover and an outer surface of the portion of the piping circuit; and
   annular support rings within the cover that are in selective supporting contact with the cover, the support rings comprising an inner ring that mounts onto the outer surface of the portion of the piping circuit, an outer ring circumscribing the inner ring, strut members that extend radially between the inner ring and outer ring, and radial gaps that are selectively expandable so that the piping circuit is received in the support rings.

2. The containment system of claim 1, further comprising end plates coupled to opposing axial ends of the cover.

3. The containment system of claim 1, further comprising a fluid inlet port formed through a sidewall of the cover and that is in selective communication with a source of pressurized blanketing gas, so that when pressurized blanketing gas is directed into the confined space, the pressurized blanketing gas provides a thermal barrier between an uninsulated section of the portion of the piping circuit and ambient to the cover.

4. The containment system of claim 3, further comprising a diffuser between the fluid inlet port and the portion of the piping circuit, and which disperses the pressurized blanketing gas into the confined space and diverts a stream of the pressurized blanketing gas away from direct contact with the portion of the piping circuit.

5. The containment system of claim 3, wherein the fluid inlet port comprises a first fluid inlet port, the containment system further comprising a second fluid inlet port and a manifold connected between the source of the pressurized blanketing gas and the first and second fluid inlet ports.

6. The containment system of claim 1, further comprising a tray supported in the cover that selectively receives tools.

7. The containment system of claim 1, further comprising end plates comprising an inner ring that mounts onto the outer surface of the portion of the piping circuit, an outer ring circumscribing the inner ring, and sidewalls that extend radially between the inner ring and outer ring, and so that the cover is supported on the piping circuit.

8. The containment system of claim 1, further comprising end plates that are slideably mounted to the piping circuit and on opposing sides of the annular support rings, wherein gaps extend radially through the end plates and that are selectively expandable so that the piping circuit is received in the end plates.

9. A containment system for use with a piping circuit comprising:
   a cover that comprises a sheet like transparent material that is disposed around a portion of the piping circuit;
   end plates that sealingly engage opposing ends of the cover;
   a diffuser in the confined space that disperses pressurized blanketing gas that is injected into the confined space and diverts a stream of the pressurized blanketing gas away from direct contact with the portion of the piping circuit;
   a confined space defined in an annulus between the cover and an outer surface of the portion of the piping circuit and that is axially bounded by the end plates; and
   a thermal barrier formed by the pressurized blanketing gas in the confined space and that is between an uninsulated section of the portion of the piping circuit and ambient to the cover.

10. The containment system of claim 9, further comprising annular support rings disposed in the confined space, and that each have an outer circumference in supporting contact with the cover.

11. The containment system of claim 9, wherein ends of the cover that extend in a direction axial to a tubular in the piping circuit releasably join along a seam that extends substantially the length of the cover.

12. The containment system of claim 9, further comprising access ports formed through a sidewall of the cover, and gloves sealingly secured along the access ports.

13. A method of containing a piping circuit comprising:
   sealing around a portion of the piping circuit to define a confined space;
   removing cladding from around a section of the portion of the piping circuit within the confined space so that the section of the portion of the piping circuit is exposed to conditions in the confined space; and
   controlling a flow of a blanketing fluid into the confined space so that a pressure in the space exceeds a pressure ambient to the confined space to define a thermal barrier inside the confined space so that ice is prevented from forming on the section of the portion of the piping circuit when cryogenic fluids are flowing inside the piping circuit in the section.

14. The method of claim 13, wherein a cover is used to form a portion of the confined space, the method further comprising supporting a mid-portion of the cover with an axially slideable element.

15. The method of claim 13, wherein the blanketing fluid is provided to the confined space at a pressure that is greater than that ambient to the confined space.

16. The method of claim 13, further comprising diverting the blanketing fluid from the piping and diffusing the blanketing fluid in the confined space.

17. The method of claim 13, further comprising using a tool inside of the confined space, and placing the tool on a tray disposed in the confined space.

* * * * *